Figure 3:
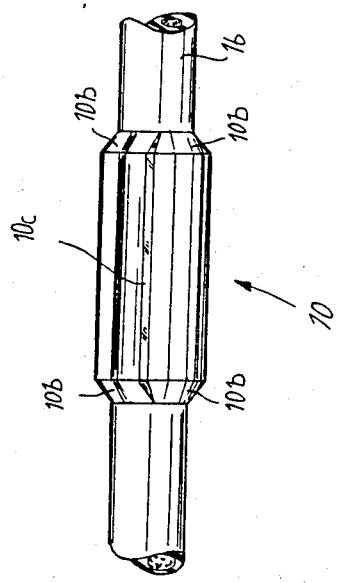

United States Patent [19]
Van Niekerk

[11] Patent Number: 4,859,534
[45] Date of Patent: Aug. 22, 1989

[54] METHOD AND APPARATUS FOR REPAIRING A CABLE

[75] Inventor: John R. Van Niekerk, Ferndale, South Africa

[73] Assignee: Chemical Vulcanising Systems (Proprietary) Limited, Roodepoort, South Africa

[21] Appl. No.: 171,183

[22] Filed: Mar. 16, 1988

Related U.S. Application Data

[63] Continuation of Ser. No. 799,421, Nov. 19, 1985, abandoned.

[30] Foreign Application Priority Data

Nov. 19, 1984 [ZA] South Africa ............... 84/8995

[51] Int. Cl.$^4$ .............................................. C09Y 7/02
[52] U.S. Cl. .................................. 428/343; 428/903; 156/49; 156/53; 156/54
[58] Field of Search .............. 428/343, 906; 156/54, 156/53, 49

[56] References Cited

U.S. PATENT DOCUMENTS

| | | | |
|---|---|---|---|
| 2,209,743 | 7/1940 | Xenis | 156/53 |
| 2,852,423 | 9/1958 | Bassett | 156/53 |
| 2,948,772 | 8/1960 | Bopp | 156/53 |
| 3,306,793 | 2/1967 | Gill et al. | 156/54 |
| 3,325,321 | 7/1967 | Maslona et al. | 156/54 |
| 3,341,385 | 9/1967 | Nago | 156/54 |
| 3,379,821 | 4/1968 | Garner | 156/54 |
| 4,512,833 | 4/1985 | Kridle et al. | 156/54 |
| 4,581,265 | 4/1986 | Follette | 156/49 |

*Primary Examiner*—Edith Buffalow
*Attorney, Agent, or Firm*—Ladas & Parry

[57] ABSTRACT

The invention provides a laminated wrap for repairing an electrical cable, the wrap being adapted to be stretched around the cable with the longitudinal sides of the wrap overlapping one another. The outer layer of the wrap is of a wear and fire resistant flexible material such as rubber while the inner layer is an adhesive layer preferably of uncured rubber which is adapted to vulcanize in contact with the surface of the cable. The outer layer includes an overlap zone which is preferably also of uncured rubber which is adapted to vulcanize in contact with the overlapping portion of the inner layer.

4 Claims, 1 Drawing Sheet

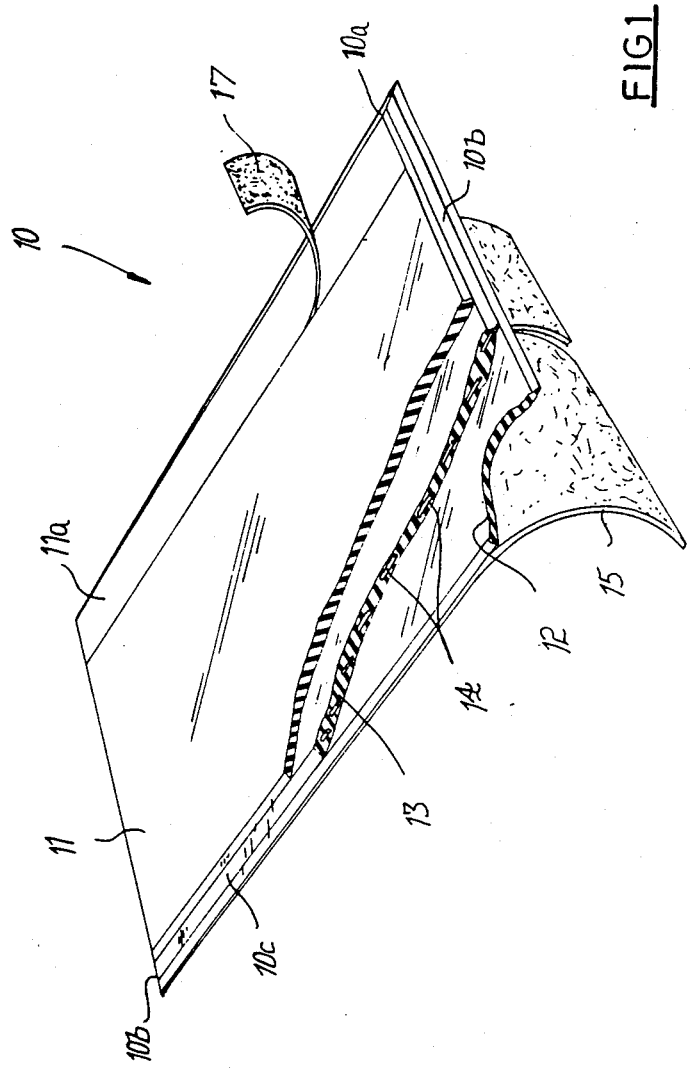

METHOD AND APPARATUS FOR REPAIRING A CABLE

This is a continuation of co-pending application Ser. No. 799,421 filed on Nov. 19, 1985, now abandoned.

This invention relates to a method and apparatus for repairing an electrical cable or the like.

Rubber sheathed electrical cables often sustain damage particularly where these are exposed as for example in underground coal mining, and the repair process is problematical. With some systems the damaged cable has to be cut to permit a repair sleeve to be slid over the cable for subsequent shrinkage on to the cable. Other repair systems, for example, require resin to be cast into a mould arranged over the damaged portion of the cable, and such repair methods are clearly time consuming and costly.

It is accordingly an object of the present invention to provide a novel cable repair system which it is believed will have certain advantages over conventional systems.

According to the invention an electrical cable repair wrap which is adapted to be wrapped around a cable with the longitudinal sides thereof in overlapping relationship comprises a laminated pad having an outer wear resistant layer which is flexible at least in a direction transverse to the axis of the cable and which includes an overlap zone along a longitudinal side thereof, and an inner adhesive layer which is adapted to adhere to the surface of the cable and to the outer surface of the outer layer at the overlap zone.

It is envisaged that for most applications the adhesive layer will be a rubber layer which is adapted to vulcanise in contact the surface of the cable. Thus the adhesive layer could be a layer of uncured rubber which is adapted to be vulcanised chemically by means of a suitable vulcanising cement or solution.

For certain applications of the invention, for example where the pad of the invention is required to protect a splice in the cable, the laminated pad will preferably include a layer of reinforcement which is adapted to prevent elongation of the pad in the direction of the cable. The reinforcement could be in the nature of strands, filiments, cloths or the like. Preferably the reinforcement will be impregnated with or captured in a matrix of rubber. It has been found that with such an arrangement a uniform bond is achieved between the reinforcing layer and the inner adhesive rubber layer.

Also according to the invention the laminate includes an outer layer, with the longitudinal side which is adapted to receive the bottom surface in an overlapping relationship being of an adherent composition. Preferably the overlap zone will be of uncured rubber which is adapted to be vulcanised chemically by means of a suitable solution or cement. Preferably the outer layer will be of a flame resistant material such as neoprene or a suitably composed rubber composition.

A further feature of the invention provides for the transverse ends to be bevelled so that the transition of zone between the cable and patch is tapered. Preferably the adherent overlap zone will also be bevelled.

Also included within the invention is a method of repairing an electrical cable at a damaged area, splice or the like, comprising the steps of providing the repair pad of the invention as disclosed herein, wrapping the pad around the cable at the damaged zone so that the longitudinal sides of the pad overlap, with substantially the entire inner surface of the pad engaging the cable surface adherently.

Where the repair pad is provided with an inner uncured rubber layer the method further includes the step of coating the layer or the surface of the cable with a vulcanising cement or solution which is adapted chemically to vulcanise the layer.

Figure 2:
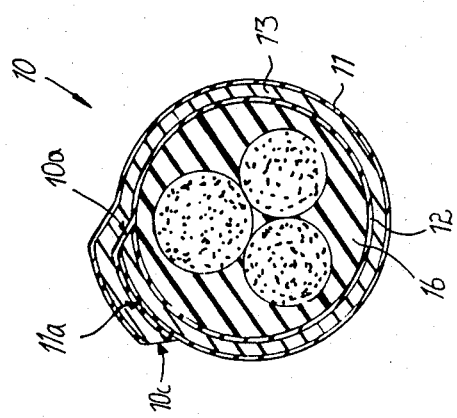

Further features of the invention will be apparent from the embodiment which is described below purely by way of example with reference to the accompanying drawings wherein:

FIG. 1 is a partially broken away perspective view of a repair pad in accordance with the invention, FIG. 2 is a cross-section through the repair pad in FIG. 1 in position on an electrical cable, and FIG. 3 is a plan view of the pad in FIG. 1 in position on an electrical cable.

Referring to the drawings a repair pad for an electrical cable comprises a laminate of flexible layers which is adapted to be wrapped around a damaged portion of the cable 16 or a splice in the cable, and caused to adhere to the surface of the cable. It is a feature of the invention that substantially the entire inner surface of the pad 10 will adhere to the electrical cable so that a puncture in the pad 10 will not permit undue ingress of moisture or the like. For this purpose the pad 10 provides an inner layer 12 which is preferably of uncured rubber which is adapted to be vulcanised on to the surface of the electrical cable 16 by means of a chemical cement or solution.

The outer layer 11 of the laminate will be of a suitably wear resistant and preferably also flame resistant material and will preferably be of cured neoprene or flame retarded rubber with a longitudinal side strip 11a being of uncured rubber and adapted to receive the corresponding longitudinal side of the bottom layer in overlapping relationship when the pad is positioned on the cable, as shown in FIG. 2. It will be appreciated that in this way adherence between the bottom layer and the 12 and the top layer 11 in the overlap zone will be particularly secure.

Where the laminate of the invention is required to protect a splice in the cable 16 it will preferably include a reinforcing layer 13 sandwiched between the layer 11 and the layer 12. It is envisged that the reinforcing layer 13 will provide tensile strength to the laminate at least in the longitudinal direction and for this purpose longitudinally disposed fibres, filiments or the like 14 will be provided in the layer. Preferably the layer 13 will be impregnated with rubber or comprise a layer of rubber within which the filiments 14 are captured.

In the arrangement illustrated the lateral ends of the patch 10 are bevelled at 10b so that the transitional zone between the cable 16 and the repaired section will be tapered as shown in FIG. 3. It is believed that where the cable 16 is subjected to frequent movement and conveyance such as in mining applications the bevelled portions 10b will render the repaired section of the cable more resistant to damage. For the same reason the free longitudinal side 10c of the pad 10 may be bevelled as shown in FIG. 2. The longitudinal side 10a at the overlap zone 11a could also be tapered for purposes of adhesion to the bottom surface of the pad, FIG. 2.

It will be appreciated that the repair device of the invention will be relatively easy to apply and will moreover provide a seal which is resistant to damage and to the ingress of moisture and dirt. Other advantages will be apparant to persons skilled in the art.

Clearly many variations of the invention exist which differ in matters of detail only but do not depart from the principles set out in the consistory clauses. For example a peel-off sheet 15 could be provided on the bottom layer 12, to protect the layer prior to use, which a further peel-off sheet 17 will protect the overlap strips 11a. The peel-off sheet 15 could be removable in sections to facilitate handling of the pad.

I claim:

1. An electrical cable repair wrap for wrapping around a cable with the longitudinal sides of the wrap in overlapping relationship, the wrap comprising: an outer wear-resistant layer which is flexible at least in one direction, transverse to the axis of a cable in use, the one direction being transverse to an overlap zone along a longitudinal side of one surface of the outer wear-resistant layer and, laminated to the one surface thereof, an inner adhesive layer for adhering to the surface of the cable and the other, outer surface of the outer wear-resistant layer at the overlap zone, the overlap zone of the outer wear-resistant layer being an adhesive material.

2. An electrical cable and repair wrap for wrapping around the cable with the longitudinal sides of the wrap in overlapping relationship, comprising: an electrical cable, an outer wear-resistant layer which is flexible at least in one direction, transverse to the axis of the electrical cable, the one direction being transverse to an overlap zone along a longitudinal side of one surface of the outer wear-resistant layer, an inner adhesive layer laminated to the one surface of the outer wear-resistant layer for adhering to the surface of the cable and to the other, outer surface of the outer wear-resistant layer at the overlap zone, the layers being wrapped around the electrical cable with the direction along the overlap zone being parallel to the axis of the electrical cable.

3. The electrical cable and repair wrap of claim 2, and further comprising a layer of reinforcement for preventing elongation of the layers in the direction along the overlap zone.

4. A method of repairing a cable, comprising:
repairing a cable;
wrapping a wrap about the cable only once in a direction transverse to the axis of the cable, the wrap having an outer wear-resistant layer which is flexible in the one direction, an overlap zone along a longitudinal side of one surface of the outer wear-resistant layer being parallel to the axis of the cable when the wrap is wrapped about the cable, and an inner adhesive layer laminated to the one surface of the outer wear-resistant being juxtaposed to the cable when the wrap is wrapped about the cable; and
adhering the adhesive layer to the cable and the other, outer surface of the wear-resistant layer at the overlap zone when the wrap is wrapped about the cable.

* * * * *